(12) United States Patent
Yeh

(10) Patent No.: US 10,209,788 B2
(45) Date of Patent: Feb. 19, 2019

(54) TOUCH PROCESSOR, TOUCH DEVICE, TOUCH SYSTEM, AND TOUCH METHOD

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 435 days.

(21) Appl. No.: 14/722,564

(22) Filed: May 27, 2015

(65) Prior Publication Data
US 2015/0346875 A1 Dec. 3, 2015

Related U.S. Application Data

(60) Provisional application No. 62/003,248, filed on May 27, 2014.

(51) Int. Cl.
G06F 3/0354 (2013.01)
G06F 3/041 (2006.01)
G06F 3/044 (2006.01)

(52) U.S. Cl.
CPC .......... *G06F 3/03545* (2013.01); *G06F 3/044* (2013.01); *G06F 3/0416* (2013.01); *G06F 2203/04101* (2013.01); *G06F 2203/04104* (2013.01)

(58) Field of Classification Search
None
See application file for complete search history.

(56) References Cited

U.S. PATENT DOCUMENTS 7,847,789 B2 * 12/2010 Kolmykov-Zotov ........................ G06F 3/03545 178/18.03
2008/0012835 A1 * 1/2008 Rimon .................... G06F 3/038 345/173
2010/0085325 A1 * 4/2010 King-Smith ........ G06F 3/03545 345/174
2010/0295559 A1 11/2010 Osoinach
2010/0328351 A1 12/2010 Tan

FOREIGN PATENT DOCUMENTS

TW 201101144 1/2011

* cited by examiner

*Primary Examiner* — Amare Mengistu
*Assistant Examiner* — Shawna Stepp Jones
(74) *Attorney, Agent, or Firm* — WPAT, PC

(57) ABSTRACT

A touch processor is provided by the present application. The touch processor detects the intensity of a third electrical signal, wherein a touch device induces a second electrical signal due to a first electrical signal, and the third electrical signal of the second electrical signal is transmitted from the touch device to an approached or touched object. Then, according to the intensity of the second electrical signal and the third electrical signal, the touch processor determines if there is a transmitter hovering on the touch device or not.

30 Claims, 7 Drawing Sheets

TOUCH PROCESSOR, TOUCH DEVICE, TOUCH SYSTEM, AND TOUCH METHOD

CROSS REFERENCE TO RELATED APPLICATIONS

This application claims priority under 35 U.S.C. 119 to U.S. provisional patent application, 62/003,248, filed on May 27, 2014, the disclosure of which is incorporated herein by reference.

BACKGROUND OF THE INVENTION

1. Field of the Invention

The present invention relates to processor, device, system and method, and more particularly, to touch processor, touch device, touch system and touch method.

2. Description of the Prior Art

Touch panel or touch sensitive screen is important human machine interface in modern age. In addition to detecting approximation or touch of human body, touch panel is also used for detecting approximation or touch of stylus or tip of stylus such that user is able to precisely control a trace painted by a touching tip.

The pen (stylus) is mainly divided into two types: one is non-active pen which cannot emit signals. The touch panel/screen detects the abovementioned non-active pen and fingers by the capacitive, resistive, or other optics, or acoustics mechanisms. The other one is active pen which can emit signals. The touch panel/screen detects the position of the active pen on the touch panel/screen and/or the status of the active pen by detecting the signals. In one embodiment, the mode for detecting non-active pen/fingers and the mode for detecting the signals emitted by the active pen are different. In another embodiment, the touch panel/screen uses two modes to detect the abovementioned objects in different time.

SUMMARY OF THE INVENTION

One objective of the present application is to provide a touch method, comprising: inducing a second electrical signal by a first electrical signal approaching a touch device; and detecting the intensity of the second electrical signal to determine if there is a transmitter hovering above the touch device.

One objective of the present application is to provide a touch method, comprising: inducing a second electrical signal by a first electrical signal approaching a touch device; and detecting the intensity of a third electrical signal transmitted from the touch device to an approaching or touching object to determine if there is a transmitter hovering above the touch device.

One objective of the present application is to provide a touch device, comprising: a electrode module, inducing a second electrical signal by a first electrical signal; and a control module, detecting the intensity of the second electrical signal to determine if there is a transmitter hovering above the touch device.

One objective of the present application is to provide a touch device, comprising: a electrode module, inducing a second electrical signal by a first electrical signal, wherein a third electrical signal of the second electrical signal is transmitted to an approaching or touching object; and a control module, detecting the intensity of the third electrical signal to determine if there is a transmitter hovering above the touch device.

One objective of the present application is to provide a touch processor, executing the operations: detecting the intensity of a second electrical signal, wherein a touch device induces a second electrical signal by a first electrical signal; and determining if there is a transmitter hovering above the touch device according to the intensity of the second electrical signal.

One objective of the present application is to provide a touch processor, executing the operations: detecting the intensity of a third electrical signal, wherein a touch device induces a second electrical signal by a first electrical signal, and the third electrical signal of the second electrical signal is transmitted from the touch device to an approaching or touching object; and determining if there is a transmitter hovering above the touch device according to the intensity of the third electrical signal.

One objective of the present application is to provide a touch system, comprising: a transmitter, emitting a first electrical signal; and a touch device, induce a second electrode signal by the first electrical signal and detects the intensity of the third electrical signal to determine if the transmitter is hovering above the touch device.

One objective of the present application is to provide a touch system, comprising: a transmitter, emitting a first electrical signal; and a touch device, induce a second electrode signal by the first electrical signal, and a third electrical signal of the second electrical signal is transmitted to an approaching or touching object, wherein the touch device detects the intensity of the third electrical signal to determine if the transmitter is hovering above the touch device.

One objective of the present application is to provide a method for detecting a hovering transmitter held by a hand, comprising: detecting a signal indicative of the transmitter by a sensor; detecting another signal indicative of the hand by the sensor; and determining if the transmitter is close to the sensor according to the signals.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
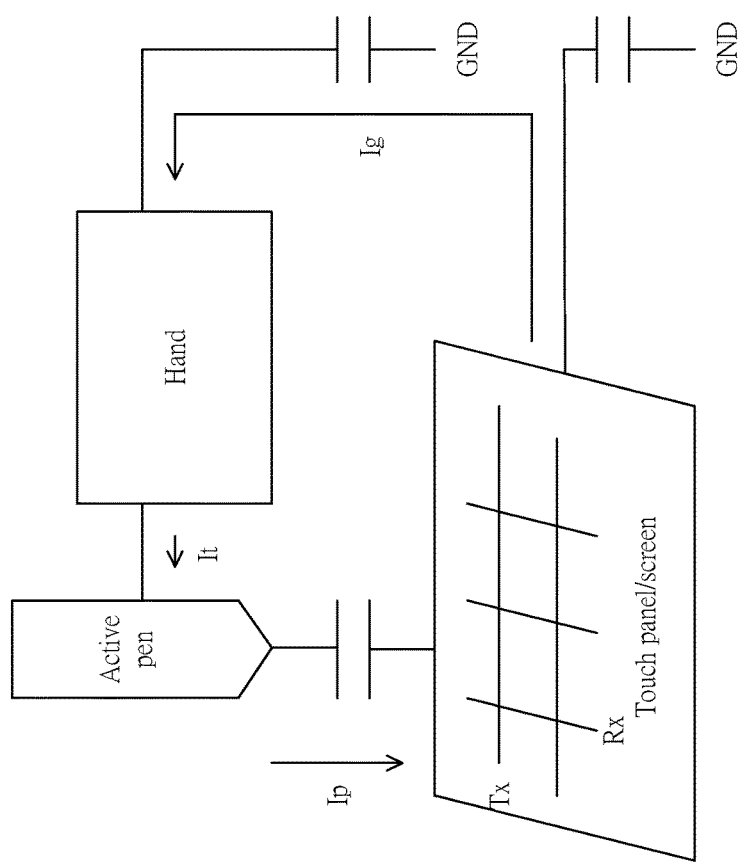
FIG. 1 depicts a diagram of a touch system in accordance with an embodiment of the present application.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

For convenience, explanations of some terms are provided below. Scope of the present application includes but not limits to the following simple explanations.

Touch Panel/Screen: A sensing layer is formed on a substrate, and its control device is capable of detecting the position of at least one conductive object approaching or touching the substrate using the sensing layer. The sensing layer may be a single-layered or multi-layered structure.

Approaching/Touching: Approaching, approximating or touching.

External Conductive Object: It can be a part of the human body, such as a finger or a palm, or an object in connection with the human body, such as a passive stylus. It can also be an active stylus which emits signals to enable a touch panel to detect the position itself. It can also be a grounded testing conductive object, such as a copper cylinder. It can also be water or conductive liquid retained on the surface of a touch panel.

Approaching/Touching Object: An external conductive object that is approaching or touching a substrate.

Approaching/Touching Event: An event of an external conductive object detected by a touch panel when the external conductive object is approaching or touching a substrate.

Sensing Layer: It includes a plurality of (m) driving electrodes parallel to a first axis and a plurality of (n) sensing electrodes parallel a second axis. The driving electrodes and the sensing electrodes are exposed from one another, forming m times n sensing points. The first axis and the second axis may be perpendicular to each other, and m can equal to n.

Driving Electrode (First Conductive Strip): A plurality of (m) electrodes which are parallel to the first axis are used to transmit driving signals. They can be made of transparent or opaque material such as Indium Tin Oxide (ITO) or carbon nanotubes. It can be a single-layered or multi-layered structure.

Sensing Electrode (Second Conductive Strip): Electrodes used for detecting capacitive signals. It can be made of transparent or opaque material such as Indium Tin Oxide (ITO) or carbon nanotubes. It can be a single-layered or multi-layered structure.

One-dimensional Sensing Information: A plurality of sensing information corresponding to a first axis or a second axis. It may indicate a collection of signal values of m sensing points of m driving electrodes corresponding to a single sensing electrode. It may also indicate a collection of signal values of n sensing points of n sensing electrodes corresponding to a single driving electrode. In other words, one-dimensional sensing information may include signal values of m sensing points, or signal values of n sensing points. One-dimensional sensing information may also include single difference values or dual difference values of m/n sensing points.

Two-dimensional Sensing Information: Sensing information formed by combining a plurality of one-dimensional sensing information. It can also be called an image.

Baseline or Stray: A signal value corresponding to a specific working frequency.

Signal Value: It can be a signal directly detected by a sensing electrode or a signal value restored from a single difference value or a dual difference value, although these two value may not be the same, they are interchangeable in some embodiments.

Single Difference Value (or simply Difference): The difference in signals values between adjacent sensing points.

Dual Difference Value: The difference between adjacent difference values.

Line Piece: All or a continuous part of one-dimensional sensing information.

Line Piece Group: A plurality of line pieces corresponding to adjacent one-dimensional sensing information, and there is at least one pair of neighboring sensing points on adjacent axes.

Ghost Point: A point or region corresponding to an unwanted capacitive sensing.

Referring to FIG. 1, one embodiment in accordance with the present invention is illustrated. In FIG. 1, an active pen hovers above a touch panel/screen. The controlling device of the touch panel/screen can detect the signal emitted by the active pen to identify the position where the active pen hovers above.

In one embodiment, the signal emitted by the active pen is grounded via the touch panel/screen, and then further through the ground to user's body or other object that holds the active pen to form a loop. The controlling device can detect the weak current by the electrode of the touch panel/screen due to this loop. In other words, the currents of this loop include Ip, Ig, and It of FIG. 1. As shown in FIG. 1, the active pen emits the current Ip to the touch panel/screen, and the current Ip flows through the touch panel/screen into the ground GND. Then, the current Ig flows through the ground GND into the hand or the above-mentioned user's body that holds the active pen, and the current It flows through the hand into the active pen.

Figure 2:
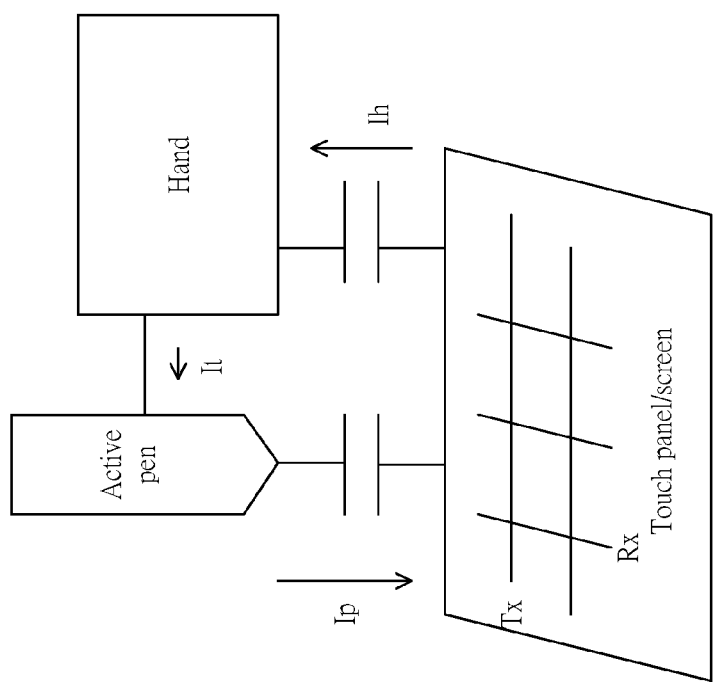
FIG. 2 depicts a diagram of a touch system in accordance with an embodiment of the present application.

In another embodiment, in addition to the loop mentioned above, the signal emitted by the active pen could also form another loop via user's body or other object touching on or hovering above the touch panel and further through user's body or other object holding the active pen. The currents of the loop include Ip, Ih, and It of FIG. 1. As shown in FIG. 2, the active pen emits the current Ip into the touch panel/screen, and the current Ih flows through the touch panel/screen into the hand holding the touch panel/screen. Then, the current It flows through the hand into the active pen.

Figure 3:
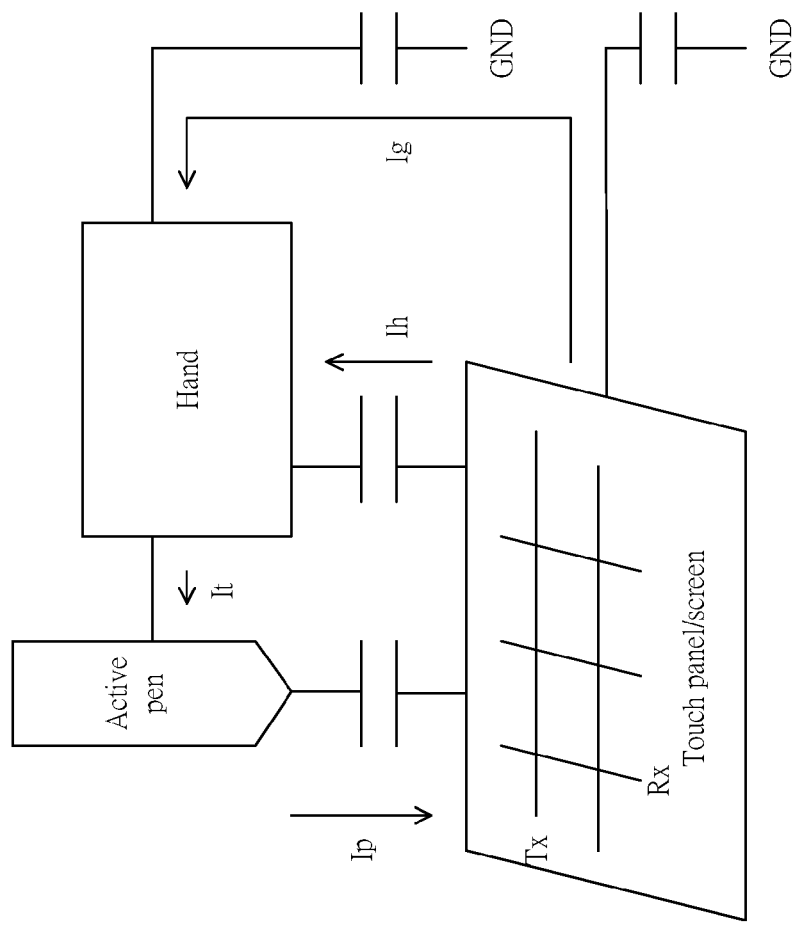
FIG. 3 depicts a diagram of a touch system in accordance with an embodiment of the present application.

In still another embodiment, two loops mentioned above exist at the same time. As shown in FIG. 3, a loop includes the above-mentioned the current Ip, the current Ig and the current It, and another loop includes the current Ip, the current Ih and the current It.

It's worth noticing that the user's body shown in FIG. 1 to FIG. 3 may be the hand holding the active pen and may be the other parts of user's body. For example, user holds the touch panel/screen by his left hand and holds the active pen by his right hand. In this case, the second loop mentioned above is from the active pen through the touch panel/screen to user's left hand, and then further through user's body to user's right hand, and finally back to the active pen.

Besides, it is noticing that user's right hand holding the active pen may touch on the touch panel/screen, may also hover above the touch panel/screen like the active pen doing, or may approach to the touch panel/screen to generate the electromagnetic induction effect.

In one embodiment, the touch panel/screen could include several types of electrodes, such as driving electrode (Tx), sensing electrode (Rx), dummy electrode, and so forth. The driving and sensing electrodes, respectively, mentioned above may be several electrodes in parallel but the driving electrodes and the sensing electrodes are orthogonal to each other. The present invention does not limit to the number, form, and shape of the electrodes.

The driving electrode Tx and the sensing electrode Rx in accordance with this invention are that when the touch panel/screen is in mutual capacitive detection mode, respectively making at least one driving electrode Tx send the driving signal, and simultaneously detects the electric change on the sensing electrode Rx caused by the extra inductive object. The driving electrodes Tx could be called as the first electrodes and the sensing electrodes could be called as the second electrodes. However, the roles of these two electrodes could be reversed.

In one embodiment, the areas occupied by the driving electrodes and the sensing electrodes are different. In one embodiment, the area occupied by the driving electrodes is bigger than the sensing electrodes. In another embodiment, the area occupied by the driving electrodes is smaller than the sensing electrodes.

In one embodiment, the controlling device could simultaneously connect to the driving electrode and the sensing electrode. In another embodiment, the controlling device could connect to the driving electrode and the sensing electrode in a time division manner. In other words, in between the driving and the sensing electrodes and the controlling device, multiplexer or interconnection network could be employed. In one embodiment, the so-called controlling device could be accomplished on one chip or several chips. The present invention does not limit to the implementations of the controlling device.

In one embodiment, the controlling device includes at least one detecting module used to connect the driving electrode Tx and/or the sensing electrode Rx of the touch panel/screen to detect the signal emitted by the active pen, and in other words, to detect the current Ip shown in FIG. 1 to FIG. 3.

In one embodiment, the detecting module mentioned above could connect to the driving electrode Tx and the sensing electrode Rx in order to detect two axial positions of the active pen simultaneously. In another embodiment, the detecting module mentioned above could connect to the driving electrode Tx and the sensing electrode Rx in a time division manner so as to detect two axial positions of the active pen alternatively.

In other words, when detecting module detects the approaching or touching position of the active pen above the touch panel/screen, two parameters (e.g. X and Y) of a 2-D coordinate of the approaching or touching position of the of the active pen above the touch panel/screen could be determined simultaneously. Or the two parameters could be determined in order. For example, the Y coordinate is determined after determining the X coordinate, and vice versa.

When the controlling device is in the signal detection mode for the active pen and when the detecting module mentioned above connects to the driving electrodes Tx, the sensing electrodes Rx or the electrodes disconnected to the detecting module could be floated, that is, they are not grounded. Accordingly, the current Ip is concentrated to the driving electrodes Tx to make the detecting module detect it much easier. On the contrary, when the detecting module mentioned above connects to the sensing electrodes Rx, the driving electrodes Tx or the electrodes disconnected to the detecting module could be floated, namely, they are not grounded. Therefore, the current Ip is concentrated to the sensing electrodes Rx to make the detecting module detect it much easier. Broadly speaking, when the detecting module connects to some electrodes, other electrodes could be floated.

It's worth noticing that the method mention above could be used to detect the current Ip, and could also be used to detect the current Ih. In other words, in the signal detection mode mentioned above, the controlling device could detect the electric change caused by the current Ip and/or the current Ih. The electric change here may be referred as the current value, the absolute value of the current value, the electric charge transfer amount, the voltage value, the voltage difference value, and so on. In one embodiment, before the controlling device switches to the signal detection mode, reference values could be measured firstly. The electric change mentioned above could be the amount change based on the reference values.

One object for this invention is to increase the ability of detecting the active pen hovering above the touch panel/screen. In the active pen being maintained at the same electric power situation, the touch device according to this invention can detect the active pen above the touch panel/screen in longer distance. When the active pen decreases the electric power, the controlling device can also detect the active pen above the touch panel/screen at the same distance to reduce the electric power consumption of the active pen.

In one embodiment, when the controlling device detects the current Ip being bigger than a threshold or the absolute value of the difference value for the current Ip and the reference value being bigger than a threshold, it is determined that the active pen hovers above the touch panel/screen. In another embodiment, when the controlling device detects the current Ih being bigger than a threshold or the absolute value of the difference value for the current Ih and the reference value being bigger than a threshold, it is determined that the active pen hovers above the touch panel/screen.

In some embodiments, when the controlling device detects a function value of the currents Ip and Ih being bigger than a threshold, it is determined that the active pen hovers above the touch panel/screen. For example, the function value mentioned above could relate to the sum of the absolute values of the currents Ip and Ih, could relate to the difference of the absolute values of the currents Ip and Ih. In some embodiments, the function value mentioned above could relate to the absolute value of the difference for the current Ip and the reference value, and the absolute value of the difference for the current Ih and the reference value, such as the sum of both or the difference of both.

Besides, the function value mentioned above could relate to the charge transfer amount of the currents Ip and Ih.

In one embodiment, if the controlling device only needs to detect whether the active pen hovers above the touch panel/screen but not required to detect the position projected by a hovering active pen, the detecting module of the controlling device only needs to connect to one type of electrodes, such as the driving or the sensing electrodes. As those mentioned above, when one type of electrodes covers a larger area, the controlling device could have priority to connect to this type of electrodes, such as the driving electrodes Tx.

Generally speaking, when the active pen is detected, and whatever whether the active pen already touches on or just hovers above the touch panel/screen, the controlling device will ignore the objects touching on the touch panel/screen. These objects could be the hand holding the active pen, the hand holding the touch panel/screen, or other objects.

Since the signal detection mode for the active pen is different to the capacitive detection mode, in one embodiment, when the controlling device detects the active pen touching on or hovering above the touch panel/screen, the capacitive detection could be stopped. In another embodiment, the controlling device could keep performing the capacitive detection but could ignore the area with the currents Ip and/or Ih being detected. In other words, the area with the currents Ip and/or Ih being detected is the area of the touch panel/screen that the active pen and/or hand touching on or hovering above. And thus, it's unnecessary to perform the mutual capacitive detection to this kind of area or the result of performing the mutual capacitive detection in this kind of area can be disregarded.

In one embodiment, the controlling device may include a multiplexer or an interconnection network. The detecting module just connects to the driving electrodes Tx or the first electrodes when detecting for the signal of the active pen. The detecting module only connects to the sensing electrodes Rx or the second electrodes when detecting for the mutual capacitive detection.

As mentioned above, the invention provides a touch device to determine if there is a transmitter hovering above the touch device. Please refer to FIG. 4, while a transmitter T, which is emitting a first electrical signal S1, is approaching a touch device Td, the touch device Td induces a second electrical signal S2 by the first electrical signal S1. The transmitter T could be the above-mentioned active pen, and the touch device Td could be the above-mentioned touch panel/screen. While the first electrical signal S1 is the current Ip, the second electrical signal S2 is the current induced by the current Ip. For example, the second electrical signal S2 is a displacement current. Accordingly, the touch device Td can detect the intensity of the second electrical signal S2 to determine if the transmitter is hovering above the touch device Td.

The touch device Td can determine that the transmitter T is touching or approaching the touch device Td by a first threshold and a second threshold. The first threshold is used for detecting a hovering object, and the second threshold is used for detecting a touching object. Thus, the second threshold is greater than the first threshold. If the touch device T determines that the intensity of the second electrical signal S2 is greater than the first threshold, it is determined that the transmitter T is hovering above the touch device Td. At this time, the touch device Td can further determine if the second electrical signal S2 is smaller than the second threshold. If the touch device Td determines that the intensity of the second electrical signal S2 is smaller than the second threshold, it is confirmed that the transmitter T is hovering above the touch device Td. If the touch device Td determines that the intensity of the second electrical signal S2 is greater than the second threshold, it is determined that the transmitter T is touching the touch device Td.

Furthermore, the first electrical signal S1 from the transmitter T includes a predetermined frequency. The predetermined frequency could be a single frequency or formed by multiple frequencies. Accordingly, the frequency of the second electrical signal S2 induced by the first electrical signal S1 should be also the predetermined frequency. Thu, before detecting the intensity of the second electrical signal S2, the touch device Td could detect the frequency of the second electrical signal S2 to determine if the transmitter approaching the touch device Td is the transmitter T corresponding to the touch device Td. If the touch device Td determines that the frequency of the second electrical signal S2 is the predetermined frequency, it is determined that the approaching transmitter corresponds to the touch device Td, or there is a transmitter T corresponding to the touch device Td. At this time, the touch device Td can further detect the intensity of the second electrical signal S2 to determine that the transmitter T is hovering or touching the touch device Td. If the touch device Td determine that the frequency of the second electrical signal S2 is not the predetermined frequency, it is determined that the approaching transmitter does not correspond to the touch device Td, or there is no transmitter corresponding to the touch device Td, and it is unnecessary to execute the following operations for detecting the intensities of the electrical signals.

In addition, the touch device Td can also detect the frequency of the second electrical signal S2 to determine if the transmitter hovering above the touch device Td is the predetermined transmitter T after detecting the intensity of the second electrical signal S2.

Please refer to FIG. 4 again, while an approaching or touching object Ob electrically coupling with the transmitter T is approaching or touching the touch device Td, a third electrical signal S3 induced by the first electrical signal S1 will be transmitted into the approaching or touching object Ob. The approaching or touching object Ob can be a hand holding the transmitter T or can be the other hand holding the touch device Td.

Accordingly, the invention discloses a touch device to determine if there is a transmitter hovering above the touch device. Please refer to FIG. 4, the transmitter T emits a first electrical signal S1, and the touch device induces a second electrical signal S2 by the first electrical signal S1. At this time, a third electrical signal S3 induced by the first electrical signal S1 is transmitted into an approaching or touching object. Then a detected signal by detecting the intensity of the second electrical signal S2 or a difference between the second electrical signal S2 and the third electrical signal S3 can be used to determine there is a transmitter hovering above the touch device.

Similarly, the touch device Td can determine that the transmitter T is touching or approaching the touch device Td by a first threshold and a second threshold. If the touch device T determines that the detected signal is greater than the first threshold, it is determined that the transmitter T is hovering above the touch device Td. At this time, the touch device Td can further determine if the detected signal is smaller than the second threshold. If the touch device Td determines that the intensity of the detected signal is smaller than the second threshold, it is confirmed that the transmitter T is hovering above the touch device Td. If the touch device Td determines that the intensity of the detected signal is greater than the second threshold, it is determined that the transmitter T is touching the touch device Td.

Furthermore, because the frequency of the second electrical signal S2 must be the same as the frequency of the third electrical signal S3, the touch device Td can detect the frequency of the third electrical signal S3 to determine if the transmitter approaching the touch device Td corresponds to the touch device Td before detecting the intensity of the third electrical signal S3. If the touch device Td determines that the frequency of the third electrical signal S3 is the above-mentioned frequency, it is determined that there is a transmitter T corresponding to the touch device Td. At this time, the touch device Td can further detect the intensity of the third electrical signal S3 to determine that the transmitter T is hovering or touching the touch device Td. If the touch device Td determine that the frequency of the third electrical signal S3 is not the predetermined frequency, it is determined that the approaching transmitter does not correspond to the touch device Td, or there is no transmitter corresponding to the touch device Td, and it is unnecessary to execute the following operations for detecting the intensities of the electrical signals.

In addition, the touch device Td can further detect a function value of the second electrical signal S2 and the third electrical signal S3 to determine if the transmitter T is hovering above the touch device after determining that the frequency of the second electrical signal S2 or the third electrical signal S3 is the predetermined frequency. If the touch device Td determines the function value is greater than a third threshold, it is determined that the transmitter T is hovering above the touch device Td. The function value mentioned above could relate to the sum of the absolute values of the second electrical signal S2 and the third electrical signal S3, could relate to the difference of the absolute values of the second electrical signal S2 and the third electrical signal S3. In some embodiments, the function value mentioned above could relate to the absolute value of the difference for the second electrical signal S2 and the reference value, and the absolute value of the difference for the third electrical signal S3 and the reference value, such as the sum of both or the difference of both.

Figure 5:
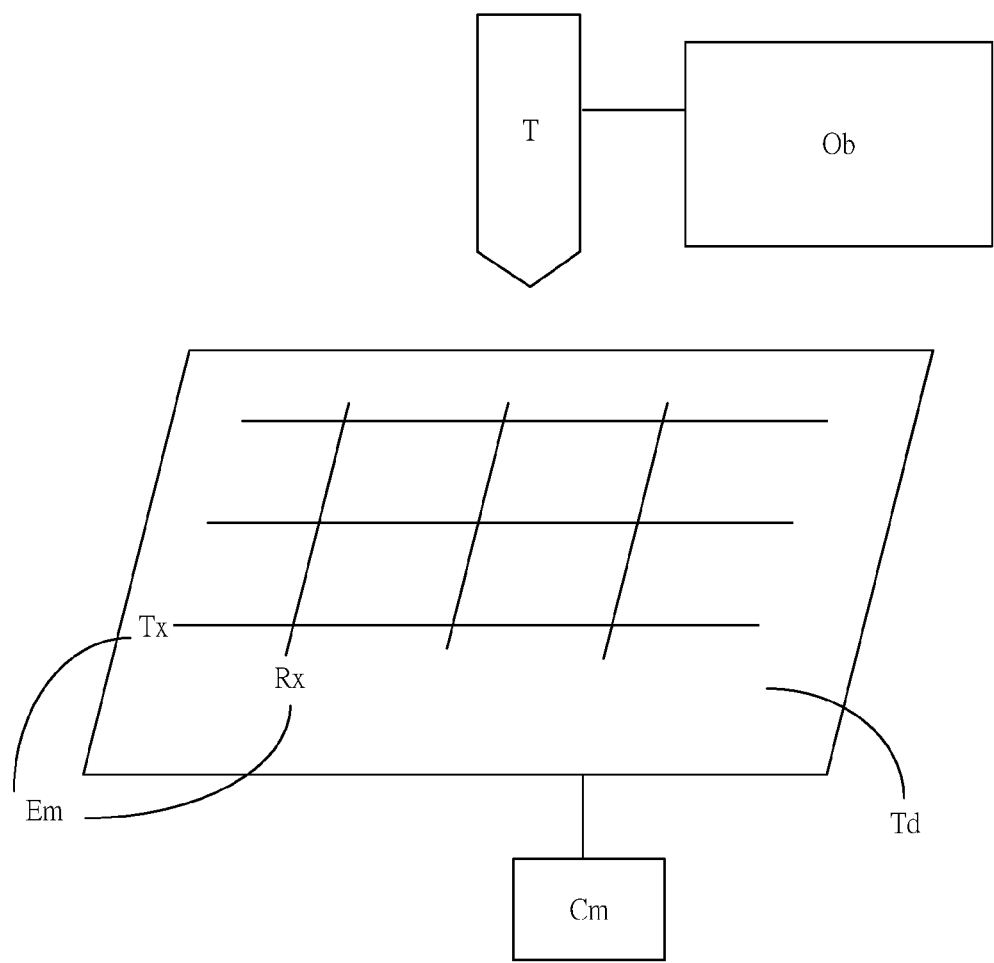
FIG. 5 depicts a diagram of a touch device in accordance with an embodiment of the present application.

Please refer to FIG. 5, the touch device Td comprises a control module Cm and a electrode module Em, wherein the electrode module comprises a plurality of driving electrodes Tx and a plurality of sensing electrodes Rx. If it is determined that the transmitter T is hovering above the touch device Td, the control module Cm can determine a hovering position of the transmitter T above the plurality of driving electrodes Tx and the hovering position of the transmitter T above the plurality of sensing electrodes Rx synchronously or asynchronously.

If it is determined that the transmitter T is hovering above the touch device Td, the control module Cm sets a region, and a hovering position of the transmitter T is within the region. Furthermore, the control module Cm detects if there is a transmitter T inside the region and executes the mutual capacitive detection of the driving electrodes Tx and the sensing electrodes Rx outside the region.

If the covering area of the plurality of driving electrodes Tx is greater than the covering area of the plurality of sensing electrodes Rx, the control module Cm detects all or part of the plurality of driving electrodes Tx to determine the intensity of the second electrical signal S2 or the intensity of the third electrical signal S3, or a function value of the second electrical signal S2 and the third electrical signal S3. On the contrary, if the covering area of the plurality of sensing electrodes Rx is greater than the covering area of the plurality of driving electrodes Tx, the control module Cm detects all or part of the plurality of sensing electrodes Rx to determine the intensity of the second electrical signal S2 or the third electrical signal S3, or a function value of the second electrical signal S2 and the third electrical signal S3.

While the control module Cm is detecting all or part of the plurality of driving electrodes Tx, the driving electrodes Tx and the sensing electrodes Rx being not detected are floated, or while the control module Cm is detecting all or part of the plurality of sensing electrodes Rx, the driving electrodes Tx and the sensing electrodes Rx being not detected are floated.

Figure 6:
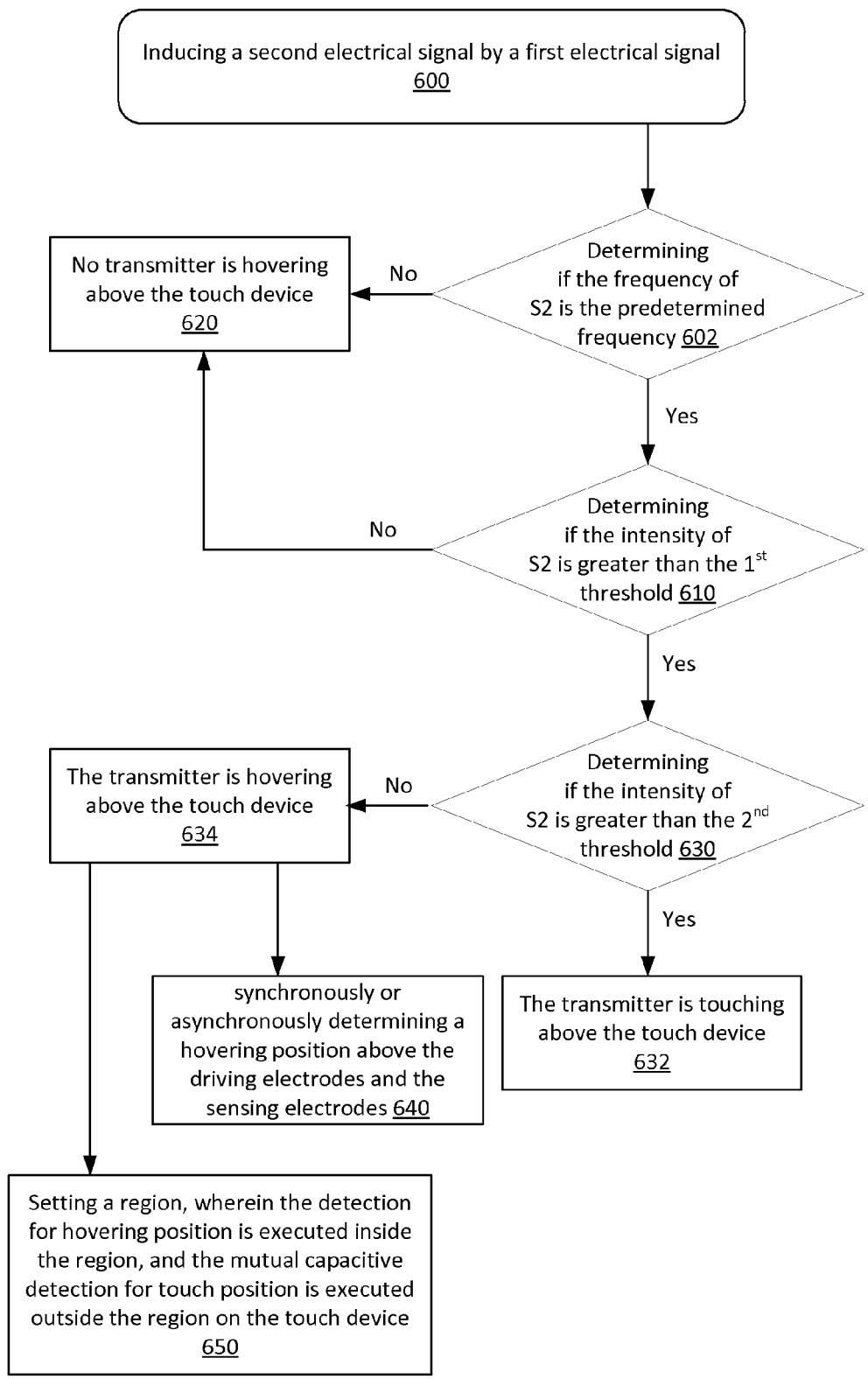
FIG. 6 depicts a flowchart diagram of a touch method in accordance with an embodiment of the present application.

Please refer to FIG. 6, the invention discloses a touch method for determining if there is a transmitter approaching a touch device. In step 600, a second electrical signal is induced by a first electrical signal. In step 610, it is determined if there is a transmitter hovering above the touch device based on if the intensity of the second electrical signal is greater than a first threshold. In step 620, it is determined that there is no transmitter hovering above the touch device if the intensity of the second electrical signal is smaller than the first threshold. In step 630, if the intensity of the second electrical signal is greater than the first threshold, it is determined if the intensity of the second electrical signal is greater than a second threshold. In step 632, it is determined that the transmitter is touching the touch device if the second electrical signal is greater than the second threshold. In step 634, it is determined that the transmitter is hovering above the touch device if the second electrical signal is smaller than the second threshold.

Beside, before executing the step 610, the step 602 of detecting if the frequency of the second electrical signal is a predetermined frequency can be executed. If the frequency of the second electrical signal is the predetermined frequency, the step 610 is executed to detect the intensity of the second electrical signal, wherein the transmitter emits the first electrical signal, and the frequency of the first electrical signal is the predetermined frequency. If the frequency of the second electrical signal is not the predetermined frequency, the step 620 is executed to determine that there is no transmitter hovering above the touch device to stop detecting the intensity of the second electrical signal.

If it is determined that the transmitter is hovering above the touch device, a hovering position of the transmitter above the plurality of driving electrodes and the hovering position of the transmitter above the plurality of sensing electrodes are determined synchronously or asynchronously, as shown in step 640. In addition, in step 650, a region is set, and a hovering position of the transmitter is within the region, wherein the detection for hovering position is executed inside the region, and the mutual capacitive detection for touch position is executed outside the region on the touch device.

Figure 7:
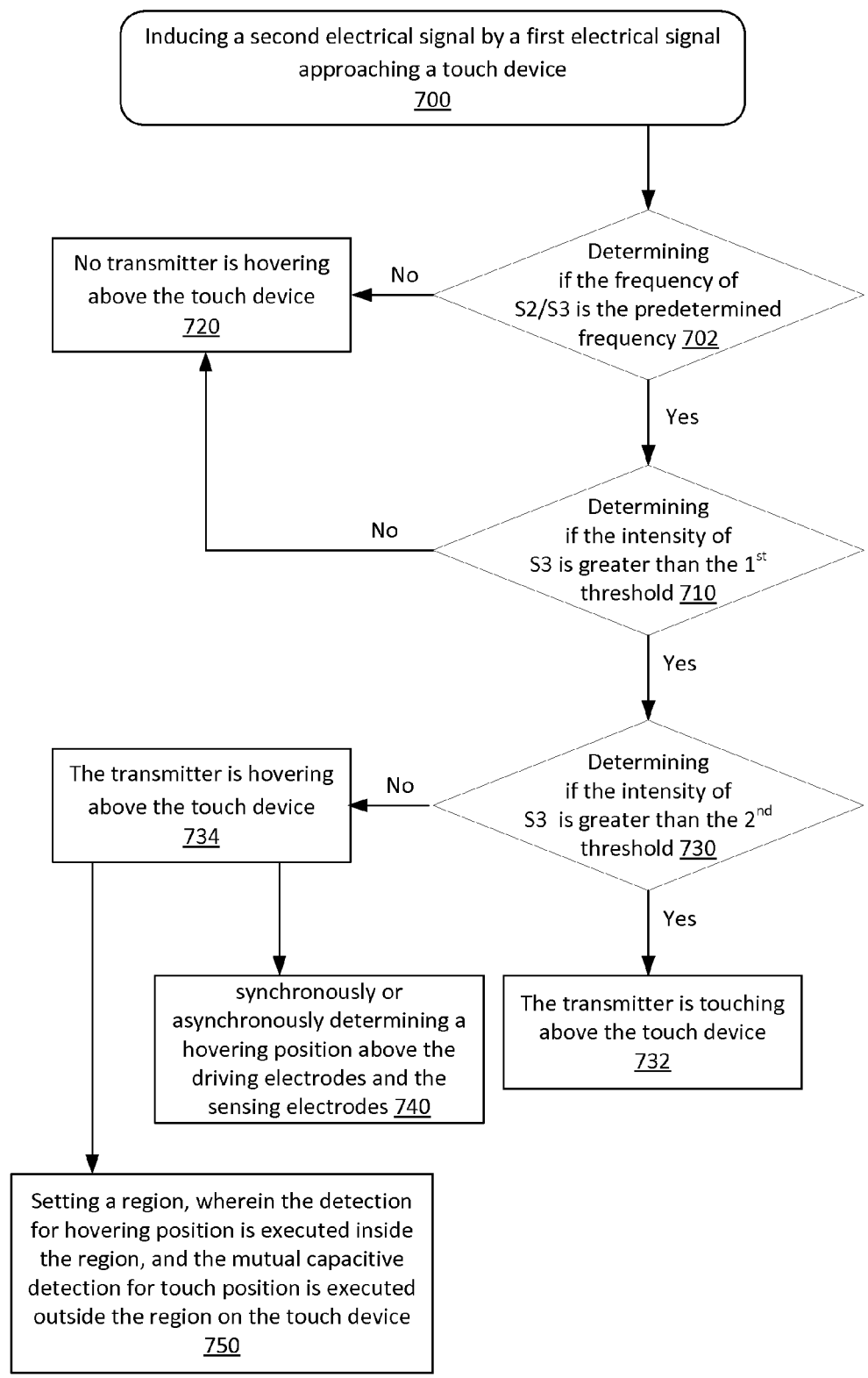
FIG. 7 depicts a flowchart diagram of a touch method in accordance with an embodiment of the present application.

Please refer to FIG. 7. The invention discloses a touch method for determining if there is a transmitter approaching a touch device. In step 700, a second electrical signal is induced by a first electrical signal. In step 710, it is determined if there is a transmitter hovering above the touch device based on if the intensity of a third electrical signal is greater than a first threshold, wherein the second electrical signal comprises the third electrical signal. In step 720, it is determined that there is no transmitter hovering above the touch device if the intensity of the third electrical signal is smaller than the first threshold. In step 730, if the intensity of the third electrical signal is greater than the first threshold, it is determined if the intensity of the third electrical signal is greater than a second threshold. In step 732, it is determined that the transmitter is touching the touch device if the third electrical signal is greater than the second threshold. In step 734, it is determined that the transmitter is hovering above the touch device if the third electrical signal is smaller than the second threshold.

Beside, before executing the step 710, the step 702 of detecting if the frequency of the second electrical signal or the third electrical signal is a predetermined frequency can be executed. If the frequency of the second electrical signal or the third electrical signal is the predetermined frequency, the step 710 is executed to detect the intensity of the third electrical signal or a function value of the second electrical signal or the third electrical signal, wherein the transmitter emits the first electrical signal, and the frequency of the first electrical signal is the predetermined frequency. If the frequency of the third electrical signal is not the predetermined frequency, the step 720 is executed to determine that there is no transmitter hovering above the touch device to stop detecting the intensity of the third electrical signal.

If it is determined that the transmitter is hovering above the touch device, a hovering position of the transmitter above the plurality of driving electrodes and the hovering position of the transmitter above the plurality of sensing electrodes are determined synchronously or asynchronously, as shown in step 740. In addition, in step 750, a region is set, and a hovering position of the transmitter is within the region, wherein the detection for hovering position is executed inside the region, and the mutual capacitive detection for touch position is executed outside the region on the touch device.

Furthermore, the electrodes are selected to detect based on the covering areas of the electrodes. If the covering area of the plurality of driving electrodes is greater than the covering area of the plurality of sensing electrodes, all or part of the plurality of driving electrodes are detected to determine the intensity of the second electrical signal. While detecting all or part of the plurality of driving electrodes, the driving electrodes being not detected and the sensing electrodes are floated.

If the covering area of the plurality of sensing electrodes is greater than the covering area of the plurality of driving electrodes, all or part of the plurality of sensing electrodes are detected to determine the intensity of the second electrical signal. While detecting all or part of the plurality of sensing electrodes, the driving electrodes and the sensing electrodes being not detected are floated.

Accordingly, the invention discloses a touch processor, executing the above-mentioned operations to detect if there is a transmitter approaching the touch device. At first, the intensity of a second electrical signal is detected, wherein a touch device induces the second electrical signal by a first electrical signal. Then, according to the intensity of the second electrical signal, it is determined if there is a transmitter hovering above the touch device. Other details are descripted as above.

In addition, the invention discloses a touch processor, executing the above-mentioned operations to detect if there is a transmitter approaching the touch device. At first, the intensity of a third electrical signal is detected, wherein a touch device induces the second electrical signal by a first electrical signal, and the third electrical signal of the second electrical signal is transmitted from the touch device to an approaching or touching object. Then, according the intensity of the third electrical signal, it is determined if there is a transmitter hovering above the touch device. Other details are described as above.

Figure 4:
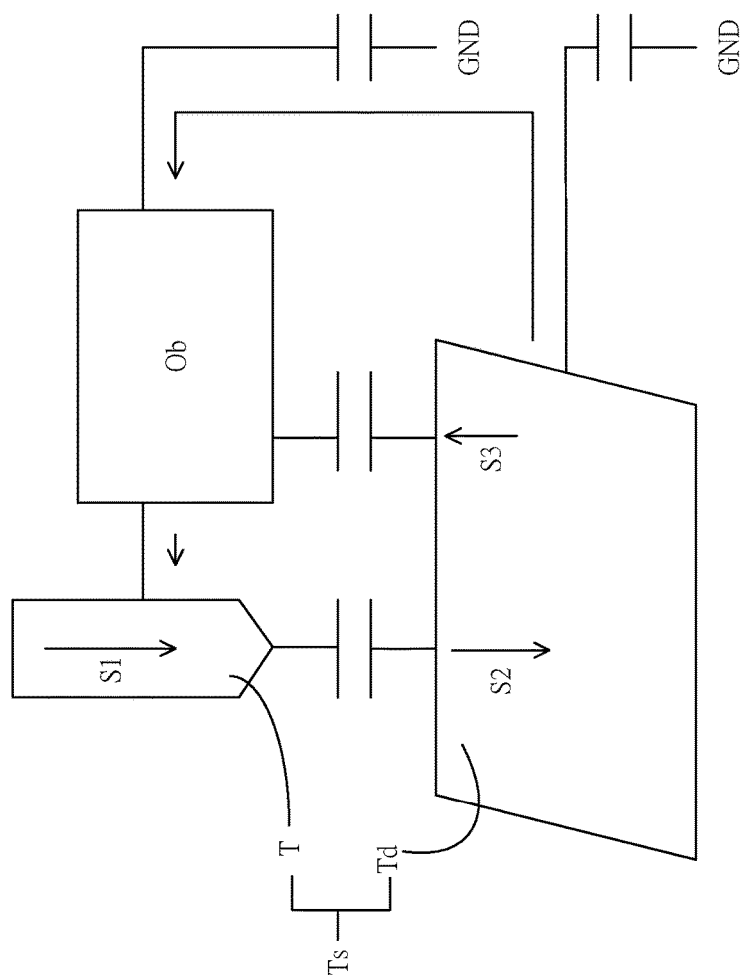
FIG. 4 depicts a diagram of a touch system in accordance with an embodiment of the present application.

Accordingly, the invention discloses a touch system Ts, comprising a transmitter T and the above-mentioned touch device Td, as shown in FIG. 4. The transmitter T emits a first electrical signal S1. The touch device Td induces a second electrical signal S2 by the first electrical signal S1, and detects the intensity of the second electrical signal S2 to determine if the transmitter T is hovering above the touch device Td.

Furthermore, the invention discloses a touch system Ts, comprising a transmitter T and the above-mentioned touch device Td, as shown in FIG. 4. The transmitter T emits a first electrical signal S1. The touch device Td induces a second electrical signal S2 by the first electrical signal S1, and a third electrical signal S3 by the first electrical signal S1 is transmitted into an approaching or touching object, wherein the touch device Td detects the intensity of the third electrical signal S3 to determine if the transmitter T is hovering above the touch device Td.

According to an embodiment of the present invention, a method for detecting a hovering transmitter (active pen) held by a hand is disclosed. The method including: detecting a signal indicative of the transmitter (the active pen) by a sensor (touch panel/screen); and detecting another signal indicative of the hand by the sensor (touch panel/screen); determining if the transmitter (the active pen) is close to the sensor (touch panel/screen) according to the signal indicative of the transmitter and the signal indicative of the hand. The signal indicative of the transmitter is the second signal S2 mentioned above. The signal indicative of the hand is the third signal S3 mentioned above. The abovementioned first signal induces the second signal S2.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch method, comprising:
   emitting a first electrical signal by a transmitter;
   detecting a second electrical signal, generated by the touch device, induced by the first electrical signal emitted by the transmitter;
   detecting the intensity of a third electrical signal of the second electrical signal transmitted from the touch device to an approaching or touching object; and
   determining if the transmitter is hovering above the touch device according to the second electrical signal and the third electrical signal, wherein the third electrical signal is a part of the second electrical signal without the first electrical.

2. The touch method of claim 1, wherein it is determined that the transmitter is hovering above the touch device if the intensity of the sum of absolute value of the second and the third electrical signal is greater than a first threshold, and it is determined that the transmitter is touching the touch device when the intensity of the sum of absolute value of the second and the third electrical signal is greater than a second threshold, wherein the second threshold is greater than the first threshold.

3. The touch method of claim 2, further comprising:
   determining if the frequency of the second electrical signal or the third electrical signal is a predetermined frequency, wherein the sum of absolute value of the second and the third electrical signal is detected if the frequency of the second electrical signal or the third electrical signal is the predetermined frequency, wherein the transmitter emits the first electrical signal, and the frequency of the first electrical signal is the predetermined frequency.

4. The touch method of claim 1, further comprising:
   determining if the frequency of the third electrical signal is a predetermined frequency, wherein the intensity of the third electrical signal is detected if the frequency of the third electrical signal is the predetermined frequency, wherein the transmitter emits the first electrical signal, and the frequency of the first electrical signal is the predetermined frequency.

5. The touch method of claim 1, wherein the touch device comprises a plurality of driving electrodes and a plurality of sensing electrodes, and if it is determined that the transmitter is hovering above the touch device, a hovering position of the transmitter above the plurality of driving electrodes and the hovering position of the transmitter above the plurality of sensing electrodes are determined synchronously or asynchronously.

6. The touch method of claim 1, wherein if it is determined that the transmitter is hovering above the touch device, a region is set, and a hovering position of the transmitter is within the region, wherein the detection for hovering position is executed inside the region, and the mutual capacitive detection for touch position is executed outside the region on the touch device.

7. The touch method of claim 1, wherein the touch device comprises a plurality of driving electrodes and a plurality of sensing electrodes, wherein if a covering area of the plurality of driving electrodes is greater than the covering area of the plurality of sensing electrodes, all or part of the plurality of driving electrodes are detected to determine the intensity of the second electrical signal, or if the covering area of the plurality of sensing electrodes is greater than the covering area of the plurality of driving electrodes, all or part of the plurality of sensing electrodes are detected to determine the intensity of the second electrical signal.

8. The touch method of claim 7, wherein while detecting all or part of the plurality of driving electrodes, the driving electrodes not being detected and the sensing electrodes are floated, or while detecting all or part of the plurality of sensing electrodes, the driving electrodes and the sensing electrodes being not detected are floated.

9. A touch device, comprising: a electrode module, generating a second electrical signal induced by a first electrical signal emitted by a transmitter, wherein a third electrical signal of the second electrical signal is transmitted to an approaching or touching object; and a controller, detecting the intensity of the third electrical signal and determining if the transmitter is hovering above the touch device according to the second electrical signal and the third electrical signal, wherein the third electrical signal is a part of the second electrical signal without the first electrical.

10. The touch device of claim 9, wherein it is determined that the transmitter is hovering above the touch device if the intensity of the sum of absolute value of the second and the third electrical signal is greater than a first threshold, and it is determined that the transmitter is touching the touch device when the intensity of the sum of absolute value of the second and the third electrical signal is greater than a second threshold, wherein the second threshold is greater than the first threshold.

11. The touch device of claim 9, wherein the controller determines if the frequency of the second electrical signal or the third electrical signal is a predetermined frequency, wherein the controller detects the sum of absolute value of the second and the third electrical signal if the frequency of the second electrical signal or the third electrical signal is the predetermined frequency, wherein the transmitter emits the first electrical signal, and the frequency of the first electrical signal is the predetermined frequency.

12. The touch device of claim 9, wherein the electrode module comprises a plurality of driving electrodes and a plurality of sensing electrodes, and if it is determined that the transmitter is hovering above the touch device, the controller determines a hovering position of the transmitter above the plurality of driving electrodes and the hovering position of the transmitter above the plurality of sensing electrodes synchronously or asynchronously.

13. The touch device of claim 9, wherein if it is determined that the transmitter is hovering above the touch device, the controller sets a region, and a hovering position of the transmitter is within the region, wherein the detection for hovering position is executed inside the region, and the mutual capacitive detection for touch position is executed outside the region on the touch device.

14. The touch device of claim 9, wherein the touch device comprises a plurality of driving electrodes and a plurality of sensing electrodes, wherein if a covering area of the plurality of driving electrodes is greater than the covering area of the plurality of sensing electrodes, the controller detects all or part of the plurality of driving electrodes to determine the intensity of the second electrical signal, or if the covering area of the plurality of sensing electrodes is greater than the covering area of the plurality of driving electrodes, the controller detects all or part of the plurality of sensing electrodes to determine the intensity of the second electrical signal.

15. The touch device of claim 14, wherein while the controller is detecting all or part of the plurality of driving electrodes, the driving electrodes not being detected and the sensing electrodes are floated, or while the controller is detecting all or part of the plurality of sensing electrodes, the driving electrodes and the sensing electrodes being not detected are floated.

16. A touch processor, executing the operations:
detecting the intensity of a third electrical signal, wherein a touch device induces a second electrical signal by a first electrical signal emitted by a transmitter, and the third electrical signal of the second electrical signal is transmitted from the touch device to an approaching or touching object; and
determining if the transmitter is hovering above the touch device according to the intensity of the second electrical signal and the third electrical signal, wherein the third electrical signal is a part of the second electrical signal without the first electrical.

17. The touch processor of claim 16, wherein it is determined that the transmitter is hovering above the touch device if the intensity of the sum of absolute value of the second and the third electrical signal is greater than a first threshold, and it is determined that the transmitter is touching the touch device when the intensity of the sum of absolute value of the second and the third electrical signal is greater than a second threshold, wherein the second threshold is greater than the first threshold.

18. The touch processor of claim 16, further comprising:
determining if the frequency of the second electrical signal or the third electrical signal is a predetermined frequency, wherein the sum of absolute value of the second and the third electrical signal is detected if the frequency of the second electrical signal or the third electrical signal is the predetermined frequency, wherein the transmitter emits the first electrical signal, and the frequency of the first electrical signal is the predetermined frequency.

19. The touch processor of claim 16, wherein the touch device comprises a plurality of driving electrodes and a plurality of sensing electrodes, and if it is determined that the transmitter is hovering above the touch device, a hovering position of the transmitter above the plurality of driving electrodes and the hovering position of the transmitter above the plurality of sensing electrodes are determined synchronously or asynchronously.

20. The touch processor of claim 16, wherein if it is determined that the transmitter is hovering above the touch device, a region is set, and a hovering position of the transmitter is within the region, wherein the detection for hovering position is executed inside the region, and the mutual capacitive detection for touch position is executed outside the region on the touch device.

21. The touch processor of claim 16, wherein the touch device comprises a plurality of driving electrodes and a plurality of sensing electrodes, wherein if a covering area of the plurality of driving electrodes is greater than the covering area of the plurality of sensing electrodes, all or part of the plurality of driving electrodes are detected to determine the intensity of the second electrical signal, or if the covering area of the plurality of sensing electrodes is greater than the covering area of the plurality of driving electrodes, all or part of the plurality of sensing electrodes are detected to determine the intensity of the second electrical signal.

22. The touch processor of claim 21, wherein while detecting all or part of the plurality of driving electrodes, the driving electrodes being not detected and the sensing electrodes are floated, or while detecting all or part of the plurality of sensing electrodes, the driving electrodes and the sensing electrodes being not detected are floated.

23. A touch system, comprising:
a transmitter, emitting a first electrical signal; and
a touch device, inducing a second electrical signal by the first electrical signal emitted by the transmitter, and a third electrical signal of the second electrical signal is transmitted to an approaching or touching object, wherein the touch device detects the intensity of the second electrical signal and the third electrical signal to determine if the transmitter is hovering above the touch device, wherein the third electrical signal is a part of the second electrical signal without the first electrical.

24. The touch system of claim 23, wherein it is determined that the transmitter is hovering above the touch device if the intensity of the sum of absolute value of the second and the third electrical signal is greater than a first threshold, and it is determined that the transmitter is touching the touch device when the intensity of the sum of absolute value of the second and the third electrical signal is greater than a second threshold, wherein the second threshold is greater than the first threshold.

25. The touch system of claim 23, wherein the touch device comprises: a electrode module, inducing the second electrical signal by the first electrical signal; and a controller, detecting the intensity of the third electrical signal to determine if the transmitter is hovering above the touch device.

26. The touch system of claim 25, wherein the controller determines if the frequency of the second electrical signal or the third electrical signal is a predetermined frequency, wherein the controller detects the sum of absolute value of the second and the third electrical signal if the frequency of the second electrical signal or the third electrical signal is the predetermined frequency, wherein the transmitter emits the first electrical signal, and the frequency of the first electrical signal is the predetermined frequency.

27. The touch system of claim 25, wherein the electrode module comprises a plurality of driving electrodes and a plurality of sensing electrodes, and if it is determined that the transmitter is hovering above the touch device, the controller determines a hovering position of the transmitter above the plurality of driving electrodes and the hovering position of the transmitter above the plurality of sensing electrodes synchronously or asynchronously.

28. The touch system of claim 25, wherein if it is determined that the transmitter is hovering above the touch device, the controller sets a region, and a hovering position of the transmitter is within the region, wherein the detection for hovering position is executed inside the region, and the mutual capacitive detection for touch position is executed outside the region on the touch device.

29. The touch system of claim 25, wherein the touch device comprises a plurality of driving electrodes and a plurality of sensing electrodes, wherein if a covering area of the plurality of driving electrodes is greater than the covering area of the plurality of sensing electrodes, the controller detects all or part of the plurality of driving electrodes to determine the intensity of the second electrical signal, or if the covering area of the plurality of sensing electrodes is greater than the covering area of the plurality of driving electrodes, the controller detects all or part of the plurality of sensing electrodes to determine the intensity of the second electrical signal.

30. The touch system of claim 29, wherein while the controller is detecting all or part of the plurality of driving electrodes, the driving electrodes being not detected and the sensing electrodes are floated, or while the controller modulo is detecting all or part of the plurality of sensing electrodes, the driving electrodes and the sensing electrodes being not detected are floated.

* * * * *